US011592977B2

(12) United States Patent
Queen et al.

(10) Patent No.: US 11,592,977 B2
(45) Date of Patent: Feb. 28, 2023

(54) INTERACTIVE MEDIA CONTENT PLATFORM

(71) Applicant: SLCKET, Inc., Overland Park, KS (US)

(72) Inventors: Manzilla Queen, Kansas City, MO (US); Jeffrey Christopher Daniel, Columbia, MO (US)

(73) Assignee: SLCKET, Inc., Overland Park, KS (US)

( * ) Notice: Subject to any disclaimer, the term of this patent is extended or adjusted under 35 U.S.C. 154(b) by 0 days.

(21) Appl. No.: 17/514,696

(22) Filed: Oct. 29, 2021

(65) Prior Publication Data

US 2022/0100338 A1 Mar. 31, 2022

Related U.S. Application Data

(63) Continuation of application No. 17/036,181, filed on Sep. 29, 2020, now Pat. No. 11,199,960.

(51) Int. Cl.
*G06F 3/0486* (2013.01)
*G06F 3/04845* (2022.01)
*G06F 3/0482* (2013.01)
*G06F 3/04883* (2022.01)

(52) U.S. Cl.
CPC .......... *G06F 3/0486* (2013.01); *G06F 3/0482* (2013.01); *G06F 3/04845* (2013.01); *G06F 3/04883* (2013.01)

(58) Field of Classification Search
CPC .. G06F 3/0486; G06F 3/0482; G06F 3/04845; G06F 3/04883
See application file for complete search history.

(56) References Cited

U.S. PATENT DOCUMENTS

| | | | |
|---|---|---|---|
| 2012/0210200 A1* | 8/2012 | Berger | G06F 3/04845 715/202 |
| 2017/0046036 A1* | 2/2017 | Yokota | H04N 1/00167 |
| 2019/0102060 A1* | 4/2019 | Ishida | G06F 3/0483 |

OTHER PUBLICATIONS

Abram et al., "Facebook for Dummies", (Mar. 2018), for Dummies, 7th Edition, <URL: https://learning.oreilly.com/library/view/facebook-for-dummies/9781119453864/18_9781119453864-ch11.xhtml#h2-2/>, p. 1-110 (Year: 2018).*
AskDifferent, "Change finder thumbnails size", (Jul. 10, 2014), <URL: https://apple.stackexchange.com/questions/138492/change-finder-thumbnails-size/>, p. 1 (Year: 2014).*

* cited by examiner

*Primary Examiner* — Mong-Shune Chung
(74) *Attorney, Agent, or Firm* — Erise IP, P.A.

(57) ABSTRACT

Methods, media, and systems are disclosed for creating and sharing interactive media. A set of media files are received, from which a background image is selected. A representation of the background image is displayed. A placement gesture is received having a release point on the display corresponding to placement of an interactive media icon within the background medium. Icon properties information is received regarding one or more properties of the interactive media icon. Icon placement information. A request to access the interactive media package is received from a second user.

20 Claims, 6 Drawing Sheets

FIG. 6

INTERACTIVE MEDIA CONTENT PLATFORM

RELATED APPLICATIONS

This patent application is a continuation application claiming priority benefit, with regard to all common subject matter, of U.S. patent application Ser. No. 17/036,181, filed Sep. 29, 2020, and entitled "INTERACTIVE MEDIA CONTENT PLATFORM." The above-referenced application is hereby incorporated by reference in its entirety into the present application.

BACKGROUND

1. Field

Embodiments of the invention relate to interactive media content. More specifically, embodiments of the invention provide methods and systems for interactive media content creation and sharing.

2. Related Art

Web browsers can render hypertext markup language (HTML) pages that contain image maps. An image map is made up of an image and corresponding sets of coordinate ranges that define individual shapes within the image. The shapes within the image may each be mapped to a hyperlink. Clicking or tapping on a point within the image corresponding to an individual shape redirects a user to the particular hyperlink corresponding to the individual shape.

One of the challenges in defining an image map is specifying the sets of coordinate ranges that define the individual shapes within the image map. It is possible to manually specify these sets of coordinate ranges by inputting HTML directly into a text editor. Such manual HTML coding is complicated and time consuming. Some tools and graphics editor plugins have been developed to facilitate the creation of image maps. However, even using a graphical image map editor, there is no easy way to create and associate interactive media with particular parts of an image. Accordingly, there is a need for an interactive media content platform that facilitates creation and consumption of interactive media content.

SUMMARY

Embodiments of the invention address the above-mentioned need by providing collections of interactive media that are associated with and positioned relative to a main image (also referred to herein as a "background image"). In certain embodiments, the interactive media is created, shared, and consumed from touch devices, including mobile touch devices. In particular, a first embodiment of the invention is broadly directed to one or more non-transitory computer-readable media storing computer-executable instructions that, when executed by a processor, perform a method for creating and sharing interactive media, the method comprising: receiving, from a first user, a plurality of media files, the plurality of media files including one or more potential background media, receiving, from the first user, a selection of a background medium from the one or more potential background media, displaying, on a display, a representation of the background medium, receiving, from the first user, a gesture having a release point on the display, the release point determining a placement of an interactive media icon associated with the representation of the background medium, receiving, from the first user, an icon properties selection regarding one or more properties of the interactive media icon, based on the selection of the background medium, the release point, and the properties of the interactive media icon, assembling icon placement information regarding the icon properties and placement of the interactive media icon, transmitting, to an application server, an interactive media package comprising: the plurality of media files, and the icon placement information, receiving, from the application server, a unique interactive media identifier corresponding to the interactive media package, and receiving, from a second user, a request to access the interactive media package corresponding to the interactive media identifier.

A second embodiment of the invention is broadly directed to a method for creating and sharing interactive media comprising: receiving, from a first user, a plurality of media files, the plurality of media files including one or more image files, receiving, from the first user, a selection of a background image from the one or more image files, displaying, on a screen, a representation of the background image, receiving, from the first user, a gesture having a release point on the screen, the release point determining a placement of an interactive media icon associated with the representation of the background image, receiving, from the first user, an icon properties selection regarding one or more properties of the interactive media icon, based on the selection of the background image, the release point, and the properties of the interactive media icon, assembling icon placement information regarding the icon properties and placement of the interactive media icon, transmitting, to an application server, an interactive media package comprising: the plurality of media files, and the icon placement information, receiving, from the application server, a unique interactive media identifier corresponding to the interactive media package, and receiving, from a second user, a request to access the interactive media package corresponding to the interactive media identifier.

A third embodiment of the invention is broadly directed to a system for creating and interacting with media, the system comprising: on a first client device, a first non-transitory computer-readable medium programmed to: receive, from a first user, a plurality of media files, the plurality of media files including one or more images, receive, from the first user, a selection of a background medium from the one or more images, display, on a display, a representation of the background medium, receive, from the first user, a placement gesture having a release point on the display, the release point determining a placement of an interactive media icon associated with the representation of the background medium, receive, from the first user, an icon properties selection regarding one or more properties of the interactive media icon, based on the selection of the background medium, the release point, and the properties of the interactive media icon, assemble icon placement information regarding the icon properties and placement of the interactive media icon, transmit, to an application server, an interactive media package comprising: the plurality of media files, and the icon placement information, on an application server, a server non-transitory computer-readable medium programmed to: based on determining at the application server, a unique interactive media identifier corresponding to the interactive media package, store the unique interactive media identifier, and receive, from a second user, a request to access the interactive media package corresponding to the interactive media identifier, and on a second client device, a second non-transitory computer-readable medium programmed to: receive the client interaction request gesture in connection with the interactive media icon, and provide responsive interactive media content.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The invention provides various embodiments of a computer program, a method, and a system for creating, sharing, and consuming interactive media content. A user that is creating interactive media content with the platform accesses the platform via a client device. The client device may be any type of computing device, such as a desktop computer, a laptop computer, phone, a wearable technology, or other computing device but will typically be a mobile device such as a tablet computer or a smartphone. These various devices are discussed in greater detail below. The client device may have one or more non-transitory computer readable media with one or more computer programs stored on the media. The computer programs instruct at least one processor to perform certain steps as defined within the computer programs. The user may also utilize more than one user device, of more than one type, to access the interactive media content platform at various times.

The subject matter of embodiments of the invention is described in detail below to meet statutory requirements; however, the description itself is not intended to limit the scope of the claims. Rather, the claimed subject matter might be embodied in other ways to include different steps or combinations of steps similar to the ones described in this document, in conjunction with other present or future technologies. Minor variations from the description below will be understood to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
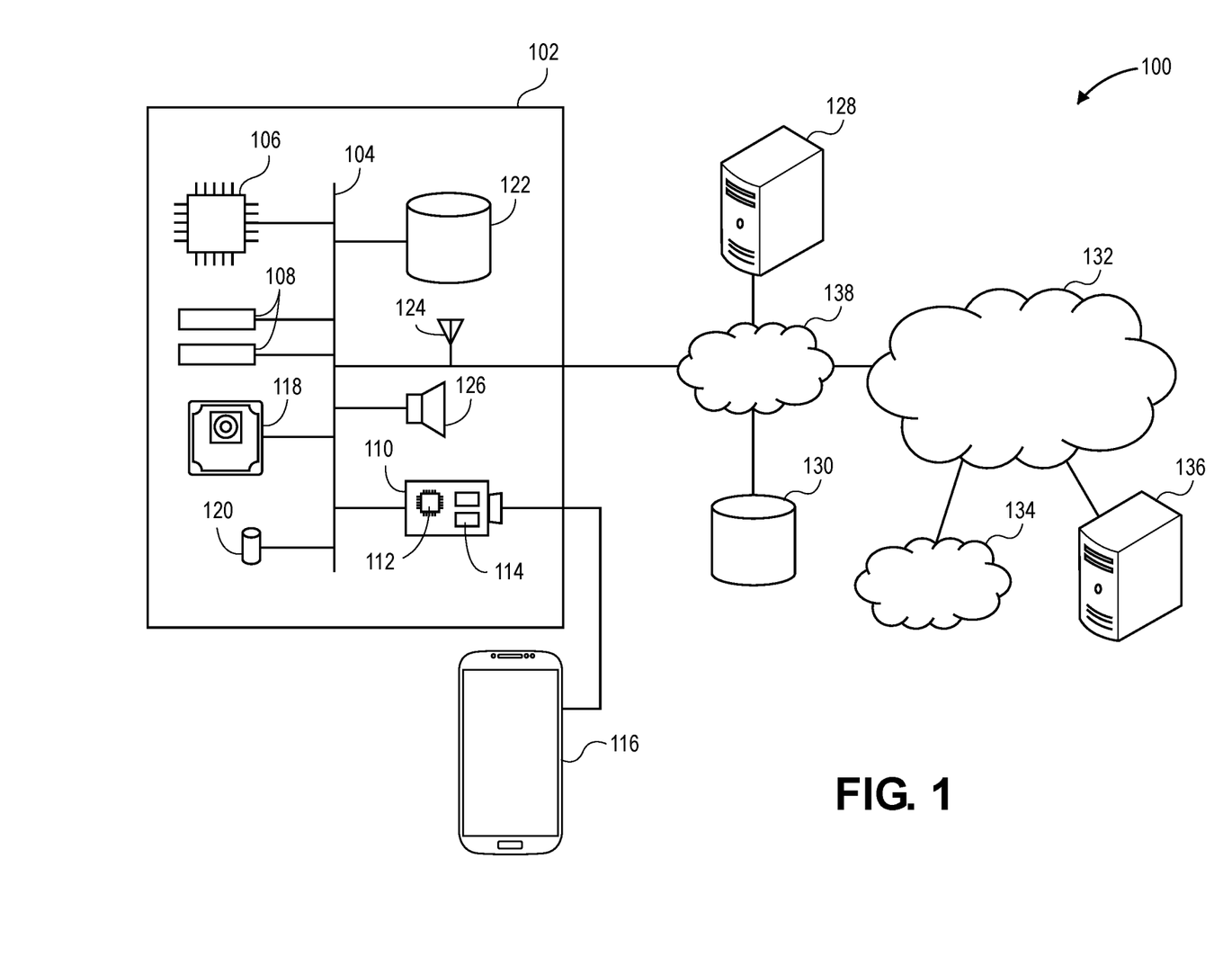
FIG. 1 depicts an exemplary hardware platform for certain embodiments of the invention.

Turning first to FIG. 1, an exemplary hardware platform for certain embodiments of the invention is depicted. System 100 provides an environment in which the various illustrated devices perform data processing operations. Device 102 can be a mobile device such as a smartphone or tablet, a desktop computer, a laptop computer, a server computer, or any other form factor of general- or special-purpose computing device. Depicted with device 102 are several components, for illustrative purposes. In some embodiments, certain components may be arranged differently or be absent. Additional components may also be present. Included in device 102 is system bus 104, via which other components of device 102 can communicate. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics module 110. In some embodiments, graphics module 110 may not be a physically separate card, but rather may be integrated into a motherboard or CPU 106. In some embodiments, graphics module 110 has a separate graphics-processing unit (GPU) 112, which can be used for graphics processing or for general purpose computing (GPGPU). Also, on graphics module 110 is GPU memory 114. Connected (directly or indirectly) to graphics module 110 is touchpad display 116 for user interaction. In some embodiments no display is present, while in others it is integrated into device 102. Similarly, camera module 118 is connected to system bus 104. Like display 116, camera module 118 may be integrated into device 102 or absent. In some embodiments, device 102 includes a microphone 120 and a speaker 126. Also connected to system bus 104 is local storage 122, which may be any form of computer-readable medium and may be internally installed in device 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Wireless transceiver 124 is also attached to system bus 104 and allows device 102 to communicate over a network such as network 138. Wireless transceiver 124 can be any form of wireless network interface known in the art, such as cellular mobile data or Wi-Fi (i.e., the IEEE 802.11 family of standards). It is understood that any other type of network connection could be alternatively employed, including a wired network. Wireless transceiver 124 connects device 102 to local network 138, which may also include one or more other computers, such as computer 128, and network storage, such as data store 130. Generally, a data store such as data store 130 may be any repository that can store and retrieve information as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 138, or remotely accessible over Internet 132. Local network 138 is in turn connected to Internet 132, which connects many networks such as local network 138, remote network 134 or directly attached computers such as computer 136. In some embodiments, device 102 may itself be directly connected to Internet 132.

Figure 2:
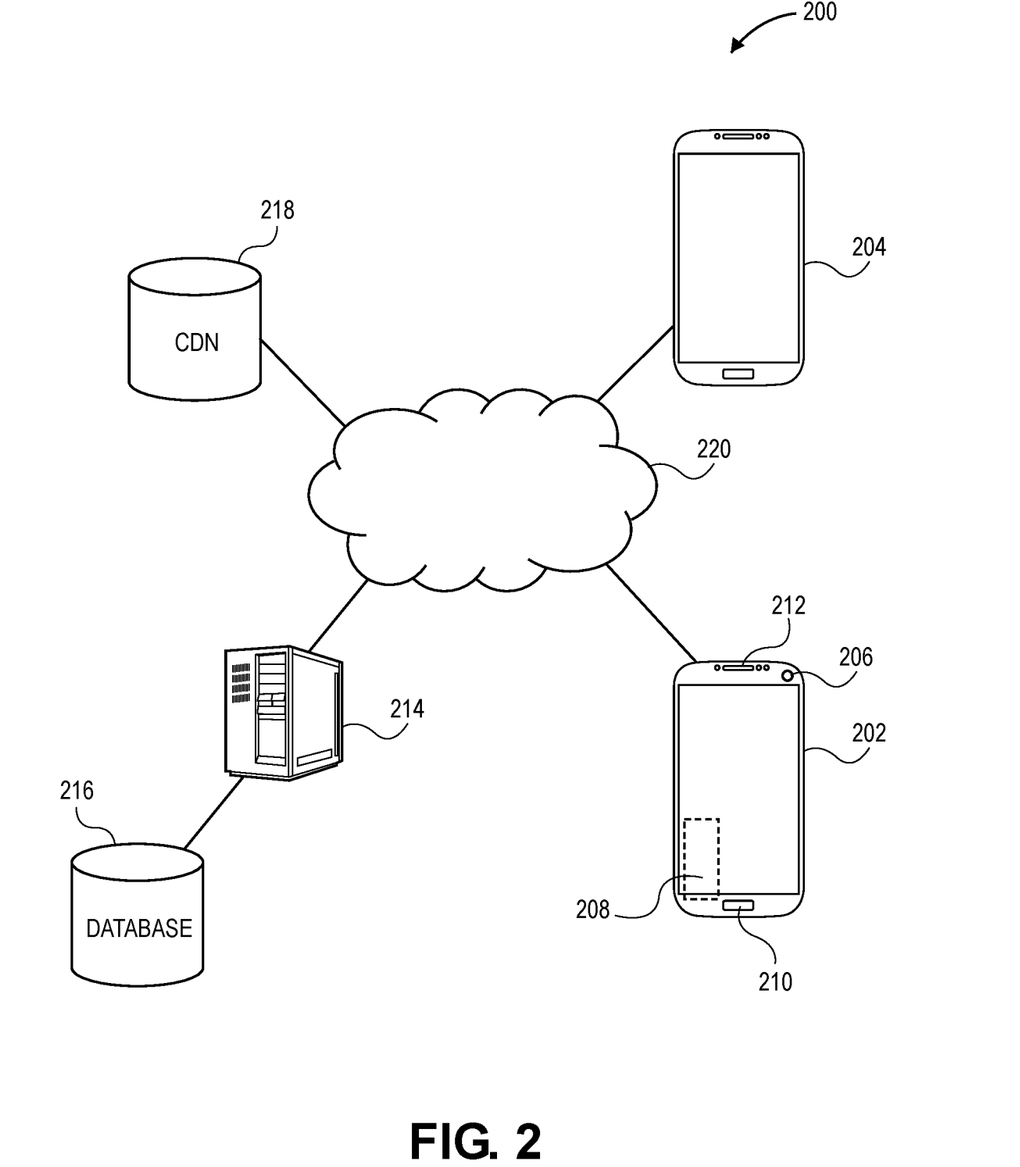
FIG. 2 depicts a system diagram showing the components of a system for carrying out embodiments of the invention.

Turning now to FIG. 2, a system diagram showing the components of a system for carrying out embodiments of the invention is depicted and referred to generally by reference numeral 200. System 200 provides a platform for creating, sharing, and consuming interactive media content. As used herein, interactive media content refers to media, such as images and video, that a user can interact with. In one embodiment, a content-creating user (or a first user) employs first mobile device 202 to create interactive media content. First mobile device 202 may be any device described in connection with FIG. 1, such as device 102. In one embodiment, first mobile device 202 is a smartphone. First mobile device 202 may be equipped with camera assembly 206. In some embodiments, camera assembly 206 is made up of optics and a photoelectric sensor capable of recording still images and video. First mobile device 202 may be equipped with multiple camera assemblies 206 with various types of sensors, including multi-color and monochrome sensors. Camera assembly 206 may optionally include a flash for using camera assembly 206 in low-lighting conditions. In one embodiment, first mobile device 202 also includes microphone 210 for recording audio and speaker 212 for producing sound.

In some embodiments, second mobile device 204 may be used by a content-consuming user (or second user) to request access to previously created interactive media content. In some embodiments, when access is granted, the interactive media content is retrieved from application server 214 and database 216. Associated media files may be temporarily persisted in a data store associated with second mobile device 204. In connection with second mobile device 204, the interactive media content may be rendered on a display associated with second mobile device 204. Using second mobile device 204, the content-consuming user may interact with the interactive media content. In some embodiments, there is no clear distinction between content-creating users and content-consuming users. In these embodiments, first and second users collaborate to create and/or edit particular interactive media content.

In one embodiment, using first mobile device 202, the content-creating user starts by choosing to initialize a new interactive media package. As used herein, an interactive media package includes a collection of media files, a definition of how the media files relate to each other, and details regarding how a user can interact with the media files. The collection of media files may be either captured with the first mobile device 202 or otherwise obtained, received, or associated with the first mobile device 202. In one embodiment, the new interactive media package is initialized on internal data store 208 of first mobile device 202. In an alternative embodiment, the new interactive media package is initialized directly on database 216 by making one or more API calls to application server 214 via network 220. The separate media files to be collected may be associated with an interactive media post or interactive media message associated with the interactive media package and persisted in internal data store 208 or database 216. In one embodiment, the posts and/or messages are related to content-creation profiles associated with one or more users. In some embodiments, users are related to each other through connections. In some embodiments, the posts and/or messages are associated with a unique interactive media identifier that uniquely identifies a particular interactive media package.

In some embodiments, users can subscribe to one or more of the posts or messages. When a content-creating user changes or edits an interactive media package associated with a post or message and subsequently publishes the changed or edited interactive media package, these changes may then be reflected for the subscribing users in near real-time. In some embodiments, when interactive media content is published, it is viewable to those users who have connected to the content-creating user. In one embodiment, when the interactive media content is shared, it may be sent privately to other users on any platform or messaging system that the content-creating user chooses to utilize. In some embodiments, sharing interactive media content involves e-mailing a link to the interactive media package. In some alternative embodiments, interactive media content may be stored and later retrieved either by the content-creating user or by a different content-consuming user. In such an embodiment, before providing the content-consuming user access to the interactive media content, it is first determined whether the content-consuming user is authorized to access the interactive media content based on authorization data associated with the interactive media content. In some embodiments, authorization information is stored in database 216.

In some embodiments, collected media files associated with one or more interactive media packages are stored in one or more static content delivery networks (CDN) 218 in the cloud. CDN are geographically distributed networks of caching proxy servers in geographically distributed data centers. CDN provide highly available and performant caching of media by distributing the media files and providing the media files geographically closer to end users. By using CDN 218, overall network bandwidth is conserved. Content-consuming users of the interactive media content are provided with geographically proximate, cached access to the media content, thereby improving the user experience for the content-consuming user.

Figure 3:
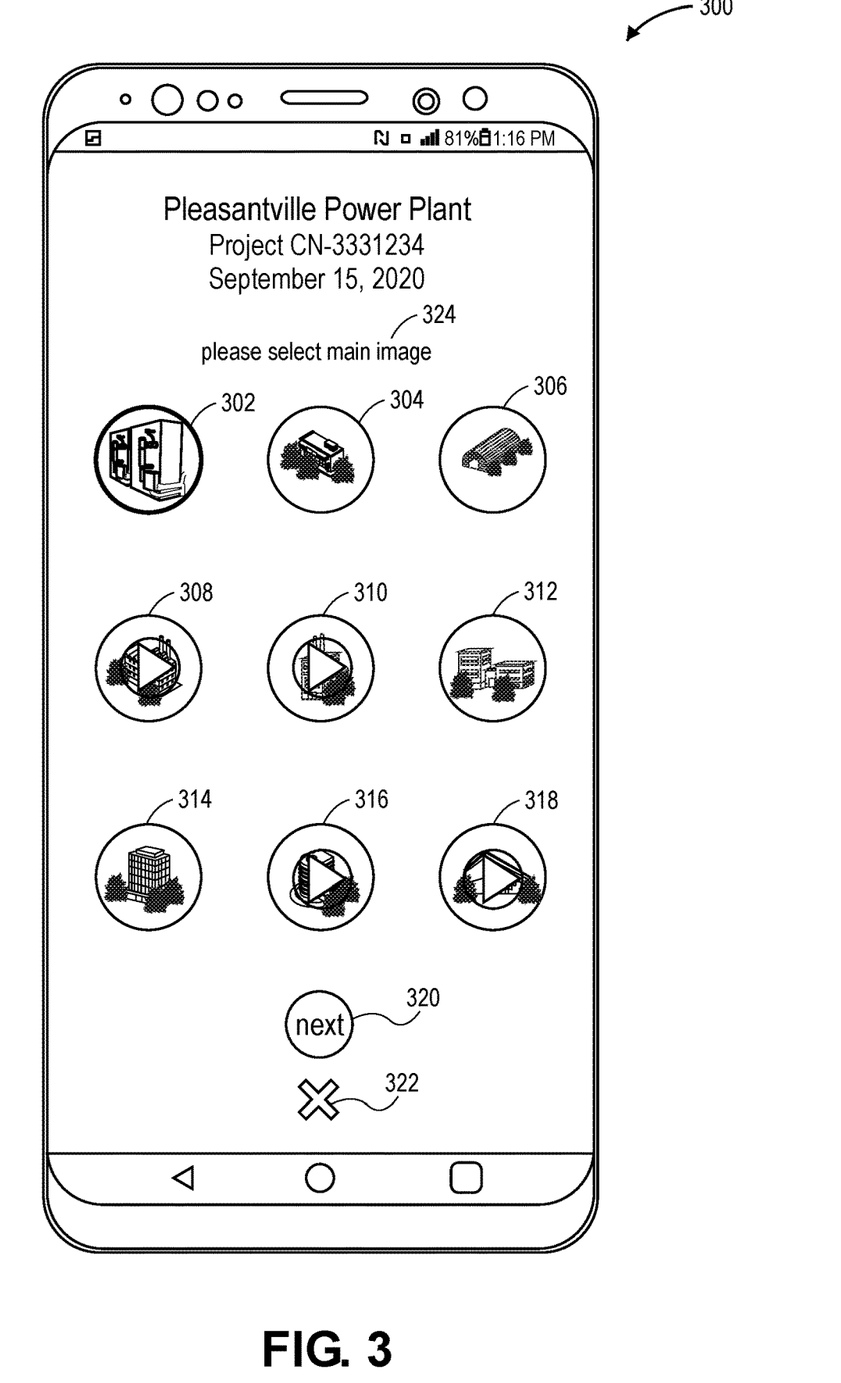
FIG. 3 is a depiction of a graphical user interface for selecting a background medium as displayed on a mobile device.

Turning now to FIG. 3, a graphical user interface component is depicted for selecting a background medium as displayed on a mobile device, the user interface component being referred to generally by reference numeral 300. As used herein, a background medium refers to a digital medium that forms a backdrop for interactive media content. In embodiments, the content-creating user generates, creates, builds, compiles, or otherwise assembles a plurality of media files. In embodiments, one or more of the plurality of media files may be used as the background medium. The content-creating user may obtain the media files from any content source, including third-party content sources, or may generate the media files by way of various processes. One process is to capture media in the form of still images or video in connection with camera assembly 206. In one embodiment, captured video is recorded by camera assembly 206 with synchronous audio being captured by microphone 210. Another process involves selecting a downloaded or pre-created media file from a gallery stored in data store 208. Yet another process involves recording audio in connection with microphone 210. Additionally, media in the form of text files may be created by entering or dictating text, for example. In one embodiment, the plurality of media files is temporarily stored on internal data store 208 of first mobile device 202. In an alternative embodiment, the plurality of media files is directly uploaded to database 216 by making one or more API calls to application server 214 via network 220. In some embodiments, as each media file is obtained or generated it is posted via an API call to application server 214. In these embodiments, after a complete set of media files is obtained or generated, a further API call is initiated to assemble the media files into a collection of media files. In some embodiments, where the media files are large, the media files are broken up into smaller segments or "chunks" and a connection is established to an API endpoint associated with application server 214. While a connection to the API endpoint remains open, the chunks are sequentially posted to the API endpoint until an entire large-sized media file has been delivered to the API endpoint. In some embodiments, once the media file is received at application server 214, it is optionally transmitted to one or more CDN, and a unique media file identifier is returned to the first mobile device 202 as an API response. In some embodiments, the API response is in the form of a JavaScript Object Notation (JSON) response.

In some embodiments, once the content-creating user has accumulated an initial collection of media files, the content-creating user is presented with user interface component 300 to select one of the media files to provide a source for a background medium for the interactive media package. In alternative embodiments, the content-creating user simply creates or selects a media file and designates it as the background medium. In some embodiments, the background medium is a background image for the interactive media package. In other embodiments, the background medium is an animation. In yet other embodiments, the background medium is a color specified as a number such as, for example, a web color, which is a six-digit, three-byte hexadecimal triplet. In some embodiments, the background medium may be a video file. The background medium can be any digital, audio-visual or only visual medium that can be represented on a display.

User interface component 300 shows preview media icons 302, 304, 306, 308, 310, 312, 314, 316, and 318 associated with corresponding media files in the plurality of media files. As used herein, a preview media icon is an icon having a preview of an associated media file. For example, preview media icon 302 shows a preview of the digital image file that preview media icon 302 is associated with. Text item 324 invites the content-creating user to "please select a background medium." In one embodiment, the content-creating user clicks or taps one of the preview media icons (here icon 302), which icon may display as being selected by having a thicker outer-ring perimeter portion. Next the content-creating user clicks "next" button 320. In some embodiments, the content-creating user is then prompted to "assemble now" or "assemble later." In one embodiment, if "assemble later" is chosen, the media items are stored locally, for example in data store 208, of first mobile device 202. In other embodiments, the media items are both uploaded to application server 214 and stored locally. In yet other embodiments, the media items are only uploaded to application server 214. The content-creating user may then assemble and complete the content creation process later. In some embodiments, if the content-creating user selects "assemble now", or resumes a saved process, the content-creating user is presented with a user interface component such as the user interface component that is depicted in FIG. 4.

Figure 4:
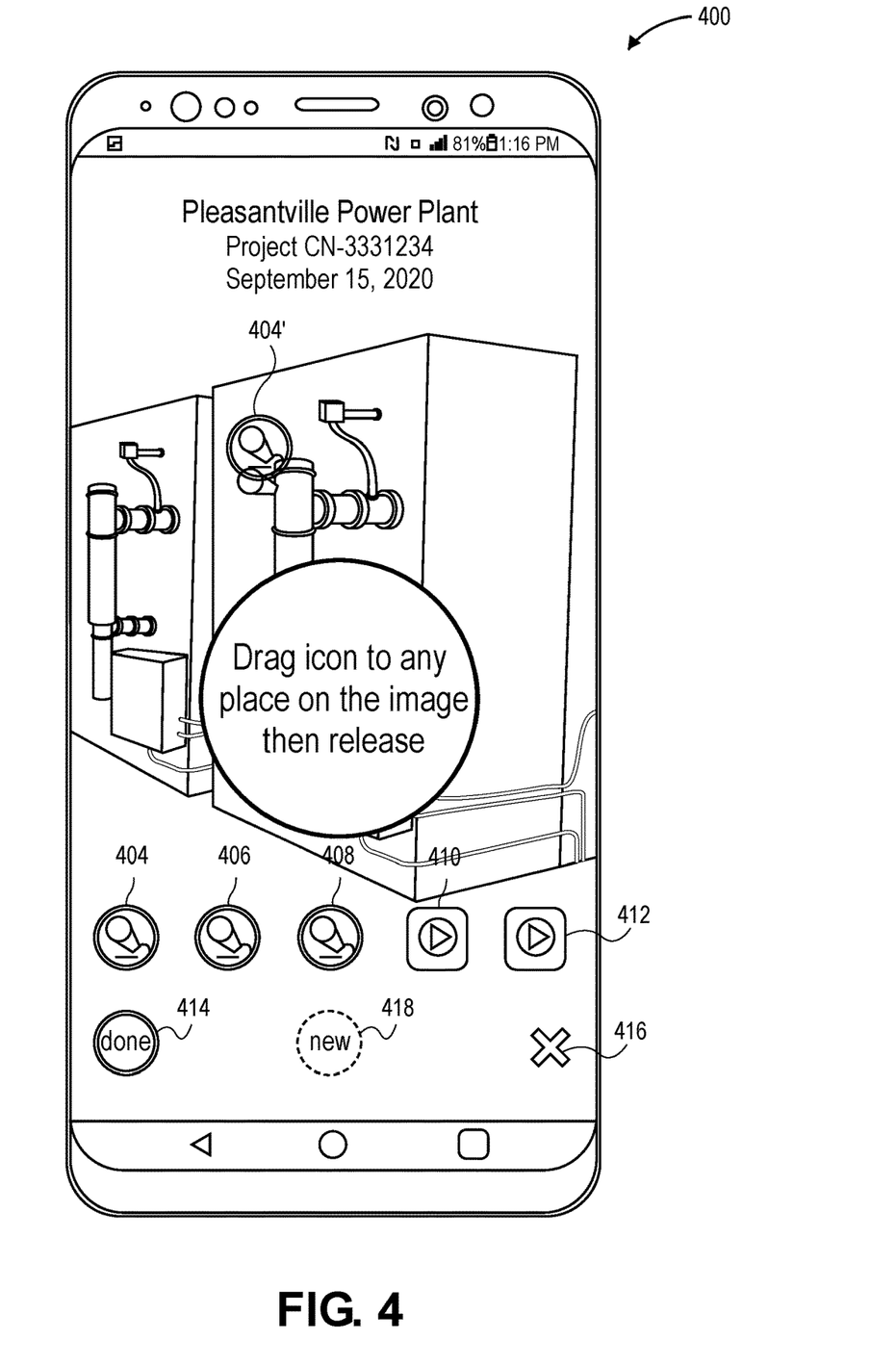
FIG. 4 is an exemplary depiction of a graphical user interface for placing interactive media icons as displayed on a mobile device.

Turning now to FIG. 4, which is an exemplary depiction of a graphical user interface for placing interactive media icons into locations on a background medium. As used herein interactive media icons are icons associated with media items such as image or video files. The background medium could be a representation of any digital media file of any type. The example background medium of FIG. 4 is a digital image of mechanical systems in a building. In this example, the mechanical systems in the building are being subject to an engineering survey. Media items associated with interactive media icons 404, 406, 408, 410, and 412 relate to details of the background medium. In the example of the mechanical systems, the media items are images, video, and text associated with the engineering survey. In one embodiment, when the interactive media icons are positioned, the locations are determined by first querying parameters associated with a user interface of first mobile device 202 to determine a screen height, screen width, height and width of the positioned icon, the number of pixels from the left edge of the screen to the middle of the positioned icon, and the number of pixels from the top of the screen to the middle of the positioned icon. Next, the left (X) and top (Y) values are divided by the screen width and heights, respectively, to determine percentages of the height and width of the background medium corresponding to left and top values associated with the interactive media icon. In this way positioning is obtained relative to proportions of the representation of the background medium, so that the interactive media icons maintain a consistent position regardless of the screen width and height values and screen resolution of various mobile devices that may be used to view associated interactive media content.

In some embodiments, once released, the interactive media icons enter a state in which the content-creating user may provide properties associated with the interactive media icons, such as color, shape (stars, dots, polygons), an image, or an audio-visual medium, including a video preview. In some embodiments, the shape of an interactive media icon is a number or letter, typically sequential, such that a series of interactive media icons are 1, 2, 3, or A, B, C, etc. In other embodiments, once an interactive media icon such as interactive media icon 408 is tapped or otherwise selected, a menu (not shown) of different shapes or icon types is provided in place of location 418. In these embodiments, once the icon type is selected, the type that is selected from the menu remains represented at location 418 until the selected media icon is emplaced.

In some embodiments, emplaced interactive media icons remain in the location where the preview interactive media icon was initially released, which associates the interactive media icon with a feature of the background image onto which the interactive media icon is placed. This allows the content-creating user to place media items onto features of the background medium so as to allow those features of the background medium to have additional media content associated with the features. In the example of the engineering survey, these details may be videos documenting functioning of various components of the associated mechanical systems. The details may also be training videos or audio or video explanations, for example, videos showing a technician how to test or repair certain components of the mechanical systems.

The media of the positioned interactive media icons may be, but are not limited to, text, video, audio, pictures, documents, live-streaming videos, web pages, information widget, product info or checkout pages, native applications, websites, animations, combinations of audio and animations, targets for video/text/audio calls, other interactive media items, i.e., interactive media content within interactive media content, or multiple or combinations of any of the media types.

Interactive media icons may vary in terms of appearance. In some embodiments, shape varies, e.g., a filled circle, a ring, a triangle, filled or outline, a diamond, a heart, or a star. Some interactive media icons may have a combination of one or more different shapes, while some will all have the same shape. In some embodiments, the shape may be selected in a way to give a visual clue as to the type or nature of the media represented by the location. Interactive media icons may also vary in color. In some embodiments, interactive media packages may have different colors for the icons while in other embodiments, the interactive media icons all share a common color scheme. The color may vary based on the underlying media type represented, the recency of the placement of an interactive media icon and/or associated underlying media, a style combination (skin) chosen by the content-creating user, or for other reasons where the category or type of interactive media icon needs to be depicted visually.

In one embodiment, once placed, an interactive media icon can be subsequently repositioned through further drag and release gestures, if the content-creating user intends to adjust or correct positioning of the interactive media icon. In some embodiments, when tapped, a modal user interface component is displayed showing the medium associated with the particular interactive media icon. In some embodiments, if the medium associated with the interactive media icon is video, the preview associated with the interactive media icon may be a portion of the associated video. In these embodiments, the segment of the video to be displayed in the preview will loop from a starting time point in the video to an ending point. In some embodiments, the starting point and ending point may be specified as described above, similarly to the way in which the shape and color of the interactive media icon may be selected and/or changed.

In one embodiment, the background medium is video. In such an embodiment, the content-creating user may drag or slide through the different frames of the video to a particular selected point in time before dragging and releasing the interactive media icons onto a frozen frame of the video. When consumed, the associated interactive media icons may be hidden until the particular selected time point in the video is reached during playback of the video that was chosen to be the background medium.

In some embodiments, content-creating users may add second nested or embedded interactive media packages to a first interactive media package when the content-creating user initializes and creates the first interactive media package. The nested interactive media packages can be either created in advance (pre-created) or newly created while creating the first interactive media package. In some embodiments, when the interactive media package has been pre-created, the nested interactive media package is added to an interactive media package in the same way an image or video would be added by placing an interactive media icon onto a background medium, where the interactive media icon is associated with a pre-created nested interactive media package. If the nested interactive media package has not been pre-created, when the content-creating user is adding interactive media icons to a particular background medium, the creating user can provide a gesture to create and place a new interactive media icon on the background medium. In one embodiment, the associated gesture is a long press at location 418 in FIG. 4, which invokes a modal user interface component with an option to create a new interactive media package. Thereafter, the nested media package is created using a process similar to the creation of a non-nested interactive media package, as described herein.

In some embodiments, metadata associated with interactive media packages may be stored in relational database 216 of FIG. 2. The metadata may include a number of properties associated with the interactive media package and the included interactive media icons. The interactive media metadata may include information regarding positioning of the interactive media icons. The interactive media metadata may alternatively or additionally include information regarding how the interactive media icons relate to one another and to the background medium. Accordingly, in some embodiments, an interactive media package contains data associated with interactive media content, data associated with the background medium, data regarding the content-creating user, data regarding positioning of the interactive media icons, time/date timestamps relating to the creation or accumulation of all associated media, and relationships between the content-creating user and recipients or subscribers to the interactive media package. Some embodiments have the benefit of storing all of these items in a single logical unit, within an interactive media package.

Once all of the interactive media icons have been positioned, the content-creating user may indicate that the creation process is complete. In some embodiments the completed interactive media package may be temporarily stored on data store 208 of first mobile device 202. Subsequently, the completed interactive media package may be uploaded to application server 214 and at least temporarily persisted in connection with database 216, with the individual media items being distributed out over CDN 218.

As noted in connection with FIG. 2 above, in some embodiments, users are both content-creating users as well as content-consuming users. In such embodiments, both the first and second users are presented with user interface component 400 that updates in near real-time when a counterpart user makes a change to the interactive media by, for example, placing interactive media icon 404 somewhere on the background medium, and releasing it, for example, at release point 404'. In one embodiment, the first user is assigned a color such as blue, and when the first user has tapped an interactive media icon or is in the process of dragging an interactive media icon, the interactive media icon will have a blue ring around its perimeter or otherwise be designated with the color blue. When the first user places and releases the interactive media icon, the blue designation may be removed from the interactive media icon. The second user's actions may have another designated color, such as red, which may be associated with an interactive media icon for the period of time that the interactive media icon is in use by the second user. In this way, simultaneous modification of any interactive media icon by both the first and second users may be prevented. If one of the users attempts to use one of the interactive media icons while the other user is using that particular interactive media icon, the user that is attempting to interact with the interactive media icon that is already in use will not be able to select the interactive media icon that is already in use until the other user has released the interactive media icon. The content-creating user then proceeds to drag and release any subsequent icons in the group of interactive media icons 406, 408, and 412. When the content-creating user is done, the content-creating user may click or tap done button 414. If the content-creating user intends to cancel the placement operation the content-creating user clicks or taps cancel button 416.

In some embodiments, geolocation is employed by use of a device-locating capability of a mobile device. In these embodiments, the content-creating user defines geofencing coordinates at the time of placing icons and providing properties of a particular interactive media icon. For instance, certain interactive media icons may only appear depending on the particular content-consuming user's latitude and longitude. In some embodiments, a particular interactive media package may selectively function, or be customized, depending on a real-time geolocation (or RFID tag proximity) of the content-consuming user. In some embodiments, geolocation may operate selectively based on the content-consuming user's location at, for example, a live event such as a concert or a sporting event, particular vendor booths in a convention center, or exhibits in a museum. In various embodiments, proximity Bluetooth beacons may be employed to provide location information, as could be WiFi or mobile data proximity or triangulation as well as any other user locating technology.

In some embodiments, interactive media packages can be exported and imported to external, third-party, media delivery platforms or systems, which implement a protocol compatible with an interactive media content delivery protocol as disclosed in connection with the present invention. Blockchain technology may be applied to the interactive media delivery protocol of the present invention, in order to provide a decentralized ledger of created interactive media packages. In this way, content-creating users are able to control access and prove original authorship of copyrighted interactive media content.

In various embodiments, artificial intelligence (AI) may be employed in interactive media content delivery as disclosed in connection with the present invention. In one embodiment, AI may operate in connection with image recognition techniques to automatically position interactive media icons over items recognized by the AI of the present invention. In one embodiment, tutorial videos or product purchase widgets may be automatically placed over items in a background medium that a user has for sale. In this embodiment, a content-creating user may provide a product catalog or data sheet as a background medium, and the interactive media icon placement AI may recognize objects within the background medium and based on a name (or other metadata) of a media file associated with interactive media icons to be placed, and provide a tentative automatic placement of the interactive media icon(s).

In various embodiments, voice commands are employed to aid in placing the interactive media icons of the present invention. In one embodiment, a content-creating user may utter voice commands to place interactive media icons into locations on the background medium. This may be alternatively to or in addition to other mouse-based, other pointer-based, or touch-based gestures to drag and release the interactive media icons. For instance, a content-creating user could speak a command of: "put the first icon in the very middle", or "add image of jogger to upper-left". Or even "move third icon up," "play media item number four", or "replace video icon three with link to www.somesite.com."

In some embodiments, interactive media packages implement interactive games such that interactive media icons are laid out to enable content-consuming users to play games with the interactive media content. Such approaches include tapping interactive media icons in a specified order, implementing a puzzle or by tapping interactive media icons in a way to match related or similar underlying media, in a memory game type of configuration. Additional use cases include: E-commerce, telemedicine, on-site engineering surveys, realtor listings, influencer marketing, digital storytelling, virtual kiosks, virtual concerts, and virtual museum tours.

Figure 5A:
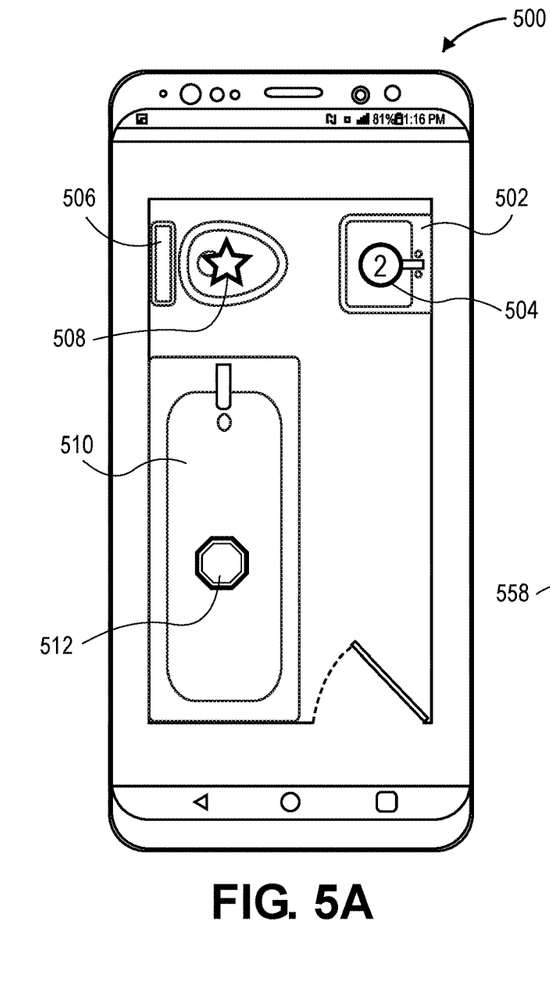
FIGS. 5A-5C are exemplary renderings of a graphical user interface for interacting with interactive media content on a mobile device.

Turning now to FIG. 5A, which depicts an exemplary rendering of a graphical user interface for interacting with interactive media content on a mobile device, the user interface component being referred to generally by reference numeral 500. User interface component 500 is a rendering of an interactive media package created by a content-creating user and shared to a content-consuming user. The exemplary background medium is an architectural rendering of a bathroom. Within the rendering of the bathroom are three plumbing fixtures: sink 502, toilet 506 and bathtub 510. Each of the plumbing fixtures has an associated interactive media icon. Sink 502 has circular interactive media icon 504. Toilet 506 has associated star-shaped interactive media icon 508, and bathtub 510 has octagon-shaped interactive media icon 512. When the content-consuming user taps any of the interactive media icons 504, 508, or 512, the user may be taken to a new user interface component associated with a media item associated with the particular interactive media icon, such as FIG. 5B, which is associated with sink 502.

In alternative embodiments, an interactive media icon has a number attached to the interactive media icon such that when the content-consuming user zooms, e.g., with a multi-touch, pinch-to-zoom gesture, the interactive media icon is replaced with several underlying interactive media icons. The number of underlying interactive media icons may be based on the count displayed on the original interactive media icon. In these embodiments, this feature may be used in connection with an architect's floorplan such as the floorplan of FIG. 5A, where interactive media icon 504 bears the number 2, placed in the middle of the sink fully zoomed-out. When the content-consuming user zooms in on the sink, the numbered interactive media icon may be replaced by two corresponding interactive media icons as in FIG. 5B. In some embodiments, the number associated with the interactive media icon is in the center of the interactive media icon as shown in connection with interactive media icon 504. In other embodiments, the number is rendered off-center such as in the upper-right of the interactive media icon, similar to a user-interface "badge." As noted, in some embodiments, the number corresponds to an associated number of sub-icons. In other embodiments, the number corresponds to a sequence in which the interactive media icon should be interacted with. In yet other embodiments, the number corresponds to a number of media objects associated with the particular interactive media icon, such as eight video files, if the number on the interactive media icon is "8."

Figure 5B:
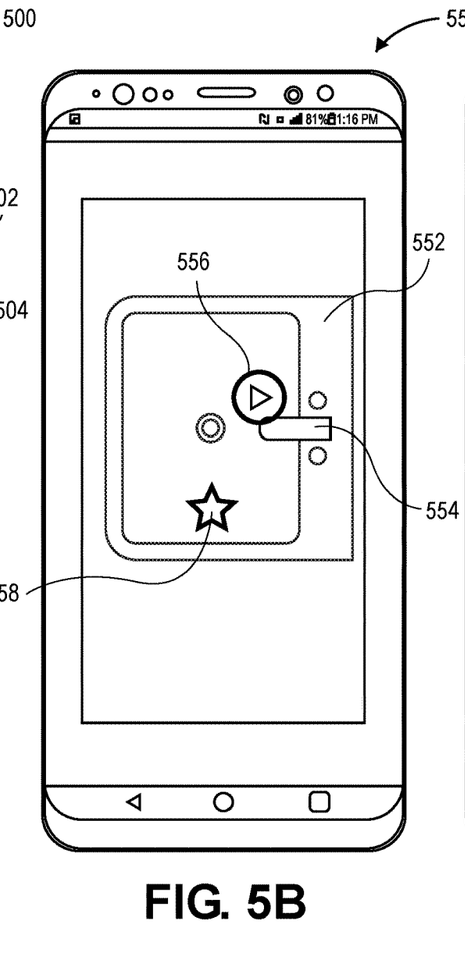

Turning now to FIG. 5B, which depicts an exemplary rendering of a graphical user interface for interacting with interactive media content on a mobile device, the user interface component being referred to generally by reference numeral 550. User interface component 550 is a rendering of expanded interactive media content expanded by zooming or tapping interactive media icon 504 from FIG. 5A. Consistent with interactive media icon 504 bearing a count designation of 2, when interactive media icon 504 is zoomed or tapped, user interface component 550 is rendered with two expanded interactive media icons. These interactive media icons are interactive media icon 556 associated with faucet 554 and interactive media icon 558 associated with sink 552.

In some other alternative embodiments, interactive media icons may have a displayed number associated therewith for different purposes. For instance, the number may represent the step order in which the viewer is supposed to tap through each of the interactive media icons. The number may also represent the cost in a virtual currency needed to "unlock" the content/media represented by that location. Tapping on interactive media icon 556, which bears a video content-type designation, takes the user to a video screen in FIG. 5C.

Figure 5C:
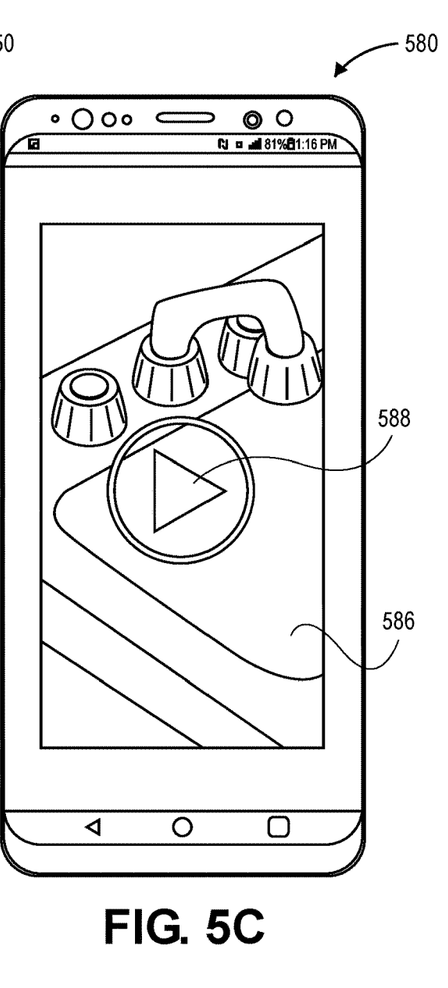

Turning now to FIG. 5C, which depicts an exemplary rendering of a graphical user interface for interacting with interactive media content on a mobile device, the user interface component being referred to generally by reference numeral 580. After tapping on interactive media icon 556 in FIG. 5B, the content-consuming user is taken to user interface component 580 which renders video 586. When the content-consuming user taps play button 588 associated with video 586, the content-consuming user is presented with a video providing information about faucet 554 of FIG. 5B, how faucet 554 operates, is connected to plumbing fixtures, and other specifications regarding faucet 554.

Figure 6:
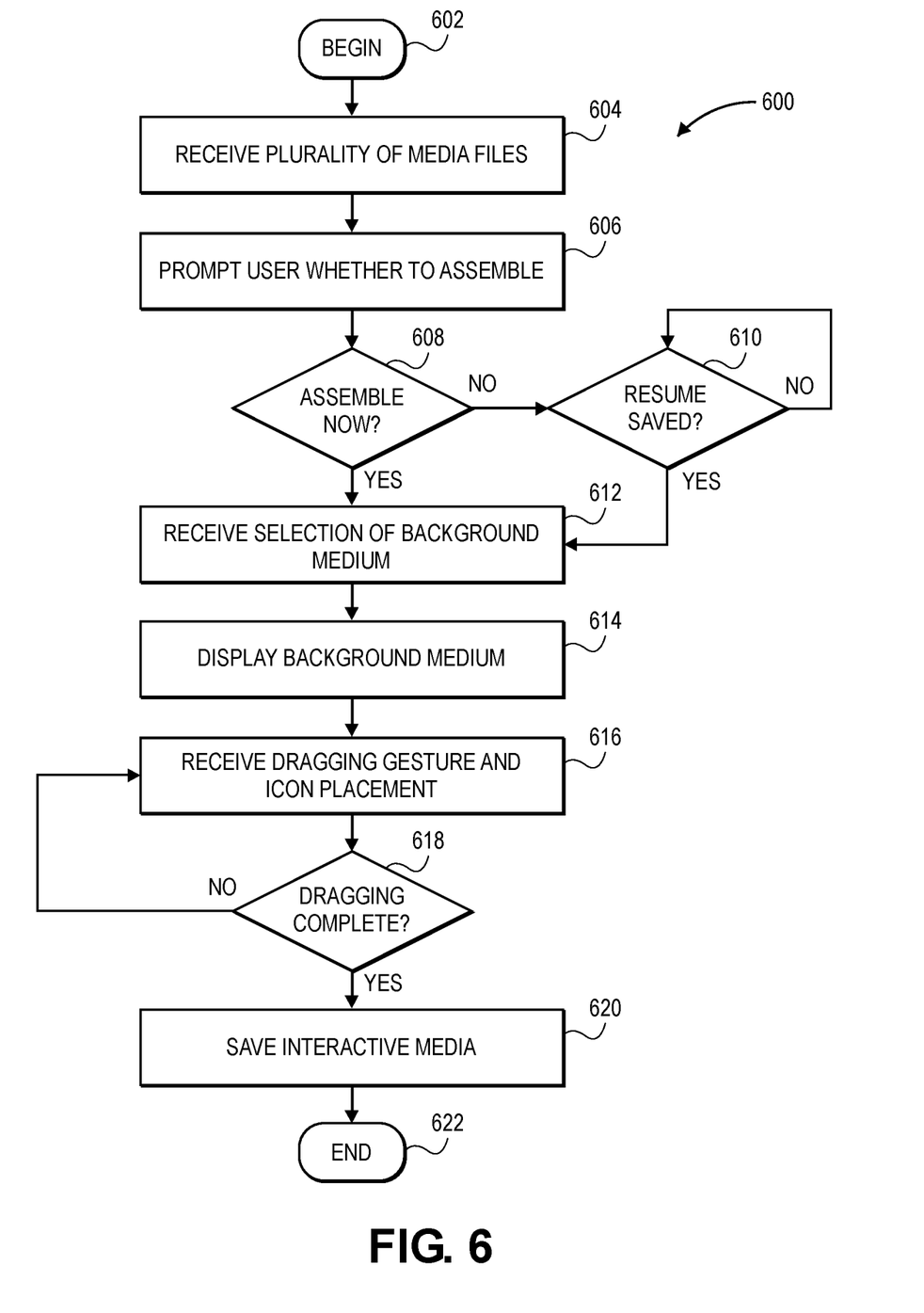
FIG. 6 is a flow diagram depicting a method for creating interactive media content.

Turning now to FIG. 6, which is a flow diagram depicting a method for creating interactive media content and referred to generally by reference numeral 600. Initially, at step 602 execution begins. At step 604, an application running on a device (such as first mobile device 202) receives a plurality of media files. As described above in connection with FIG. 2, these media files may be acquired in various ways. A first way is to capture media in the form of still images or video using the integrated peripherals associated with first mobile device 202. In one embodiment, captured video is recorded with a camera in first mobile device 202, with synchronous audio being captured in sync with the video. A second way involves selecting downloaded or pre-created media files from a gallery stored in an internal data store of first mobile device 202. A third process involves recording audio in connection with first mobile device 202. Additionally, media in the form of text files may be created by entering or dictating text, for example. In one embodiment, the plurality of media files is temporarily stored on the internal data store 208 of first mobile device 202.

In one embodiment, a modal user interface component is presented to the content-creating user with options of "assemble now" or "assemble later." In one embodiment, if "assemble later" is chosen, the media is stored locally, for example in data store 208 of first mobile device 202. In other embodiments, the media items are both uploaded to application server 214 and stored locally. In yet other embodiments, the media items are only uploaded to application server 214. At test 606, the content-creation program code associated with the application determines whether the content-creating user intends to assemble the interactive media package now. If yes, execution proceeds to step 612.

Alternatively, the content-creating user may choose to complete the content creation process later. In some embodiments, if the content-creating user selects "assemble now", or resumes a saved process (test 610), the content-creating user is presented with a user interface component such as user interface component 300. In connection with user interface component 300, the content-creating user selects a background medium. In one embodiment, the content-creating user is presented with a number of choices for selecting a background medium. The content-creating user may click or tap one of the preview media icons to select one of the icons, which icon may display as being selected by having a thicker outer ring or perimeter portion. Next the content-creating user indicates that the background medium has been selected. At step 612 the application receives the selection of the background medium from the content-creating user.

Next, at step 614, the application displays the background medium for the purpose of associating media items with the background medium in the form of interactive media icons. In some embodiments, the background medium is a background image for the interactive media package. In other embodiments, the background medium is an animation. In yet other embodiments, the background medium is a color specified as a number such as, for example, a web color, which is a six-digit, three-byte hexadecimal triplet. The background medium can be any digital, audio-visual medium that can be represented on a display. In some embodiments, the content-creating user selects a video file instead of a still image for the background medium. The content-creating user is then able to drag or slide through the different frames of the video, to a particular point in time before dragging and releasing the interactive media icons on to a frozen frame of the video. When viewed, the associated interactive media cons may be hidden until the particular time point in the video is reached during playback.

After a media file associated with the background medium is selected, the content-creating user is presented with a user interface component for positioning interactive media icons over the background medium. In one embodiment, the user is presented with a number of preview media icons that when placed will become interactive media icons associated with the collected but yet-to-be placed media files. The content-creating user then may execute a drag and release gesture on any of the icons, in any order, thereby dragging the icons into locations on the displayed representation of the background medium, which gestures the application receives at step 616.

Next, at test 618, the application determines whether the content-creating user has completed the process of dragging interactive media icons onto the background image. In one embodiment, the content-creating user provides an indication that the content-creating user is finished associating interactive media icons with the background medium. In one embodiment, the content-creating user provides this indication by tapping a button with the label "done" and execution continues to step 620. If the content-creating user has not completed dragging interactive media icons onto the background medium, the process continues back to step 616 and the application receives further dragging gestures and associated icon placement(s).

Next, at step 620, the application saves the interactive media content that the content-creating user has created. In some embodiments the completed interactive media package may be temporarily stored on data store 208 of first mobile device 202. Subsequently, the completed interactive media package may be assigned a unique interactive media identifier and be uploaded to application server 214 and at least temporarily persisted in connection with database 216, with the individual media items being distributed out over CDN 218. In some embodiments, a content-consuming user requests access to a saved interactive media package based on a unique media identifier. Once the content-consuming user is provided access to the interactive media package, the content-consuming user may interact with the interactive media package as described in connection with FIG. 5A-5C above.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for consuming interactive media, the method comprising:
    receiving a plurality of media files including a background medium;
    receiving icon placement information regarding an interactive media icon associated with a representation of the background medium,
    wherein the interactive media icon is responsive to interaction,
    wherein the icon placement information includes information regarding icon properties and placement of the interactive media icon,
    wherein the icon placement information includes a plurality of geofencing coordinates and location-based icon properties associated with the plurality of geofencing coordinates;
    transmitting, to an application server, an interactive media package comprising:
        the plurality of media files; and
        the icon placement information,
    receiving, from the application server, a unique interactive media identifier corresponding to the interactive media package;
    receiving, from a user, a request to access the interactive media package corresponding to the interactive media identifier;
    receiving, from the user, user location information regarding a current physical location of the user; and
    rendering an interactive display based on the plurality of media files, the icon placement information, and the user location information.

2. The non-transitory computer-readable media of claim 1, wherein the user location information comprises geolocation coordinates derived from proximity to an electronic signal.

3. The non-transitory computer-readable media of claim 1, wherein rendering the interactive display operates selectively based on one or more events taking place proximate to the current physical location of the user.

4. The non-transitory computer-readable media of claim 3, wherein the event is an exhibit.

5. The non-transitory computer-readable media of claim 1, wherein the plurality of geofencing coordinates is specified by placement location on the background medium.

6. The non-transitory computer-readable media of claim 1, wherein rendering the interactive display comprises: selectively rendering the interactive media icon depending on whether the user location information defines a physical location proximate to the plurality of geofencing coordinates.

7. The non-transitory computer-readable media of claim 1, wherein rendering the interactive display comprises: selectively enabling actions associated with interaction with the interactive media icon based on the user location information.

8. A method for consuming interactive media comprising:
    receiving a plurality of media files including a background medium;
    receiving icon placement information regarding an interactive media icon associated with a representation of the background medium,
    wherein the interactive media icon is responsive to interaction,
    wherein the icon placement information includes information regarding icon properties and placement of the interactive media icon,
    wherein the icon placement information includes a plurality of geofencing coordinates and location-based icon properties associated with the plurality of geofencing coordinates;
    transmitting, to an application server, an interactive media package comprising:
        the plurality of media files; and
        the icon placement information,
    receiving, from the application server, a unique interactive media identifier corresponding to the interactive media package;
    receiving, from a user, a request to access the interactive media package corresponding to the interactive media identifier;
    receiving, from the user, user location information regarding a current physical location of the user; and
    rendering an interactive display based on the plurality of media files, the icon placement information, and the user location information.

9. The method of claim 8, wherein the icon placement information is input via a touchscreen.

10. The method of claim 9, wherein the icon placement information is input via a dragging gesture on the touchscreen.

11. The method of claim 10, wherein the plurality of geofencing coordinates is specified by placement location on the background medium via the dragging gesture.

12. The method of claim 8, wherein rendering the interactive display comprises: selectively rendering the interactive media icon depending on whether the user location information defines a physical location proximate to the plurality of geofencing coordinates.

13. The method of claim 8, wherein the request to access the interactive media package is received at an application server.

14. The method of claim 8, wherein the icon properties comprise: specification of selective appearance of the interactive media icon depending on the user location information.

15. A system for creating and interacting with media, the system comprising:
    a non-transitory computer-readable medium programmed to:
    receive a plurality of media files including one or more potential background media;
    receive icon placement information regarding an interactive media icon associated with a representation of the background medium,
    wherein the interactive media icon is responsive to interaction,
    wherein the icon placement information includes information regarding icon properties and placement of the interactive media icon,
    wherein the icon placement information includes a plurality of geofencing coordinates and location-based icon properties associated with the plurality of geofencing coordinates;
    transmit, to an application server, an interactive media package comprising:
        the plurality of media files; and
        the icon placement information,
    receive, from the application server, a unique interactive media identifier corresponding to the interactive media package;
    receive, from a user, a request to access the interactive media package corresponding to the interactive media identifier;
    receive, from the user, user location information regarding a current physical location of the user; and
    render an interactive display based on the plurality of media files, the icon placement information, and the user location information.

16. The system of claim 15, wherein the background medium comprises a digital image indicating locations of features associated with the background medium.

17. The system of claim 15 comprising a client mobile device having a touchscreen.

18. The system of claim 17, wherein receiving icon placement information comprises a dragging gesture on the touchscreen.

19. The system of claim 15, wherein rendering the interactive display comprises: selectively rendering the interactive media icon depending on whether the user location information defines a physical location proximate to the plurality of geofencing coordinates.

20. The system of claim 15, wherein the icon properties comprise: specification of selective appearance of the interactive media icon depending on the user location information.

* * * * *